United States Patent [19]

Ibuki et al.

[11] 4,450,817
[45] May 29, 1984

[54] METHOD AND APPARATUS FOR CONTROLLING FUEL INJECTION TIMING FOR COMPRESSION IGNITION ENGINES

[75] Inventors: Noritaka Ibuki, Ogaki; Shizuo Kawai, Kariya, both of Japan

[73] Assignee: Nippondenso Co., Ltd., Kariya, Japan

[21] Appl. No.: 357,618

[22] Filed: Mar. 12, 1982

[30] Foreign Application Priority Data

Mar. 19, 1981 [JP] Japan ................................. 56-40597

[51] Int. Cl.$^3$ ............................................ F02M 59/20
[52] U.S. Cl. .................................... 123/501; 123/436
[58] Field of Search ............... 123/418, 419, 436, 357, 123/501, 502, 416, 417

[56] References Cited

U.S. PATENT DOCUMENTS

| | | | |
|---|---|---|---|
| 3,596,643 | 8/1971 | Schweitzer | 123/436 X |
| 4,130,863 | 12/1978 | Schweitzer et al. | 123/416 X |
| 4,236,214 | 11/1980 | Sasayama | 123/417 X |
| 4,286,560 | 9/1981 | Sagisaka et al. | 123/416 X |
| 4,322,800 | 3/1982 | Hisegawa et al. | 123/417 X |
| 4,368,705 | 1/1983 | Stevenson et al. | 123/357 |

Primary Examiner—Parshotam S. Lall
Assistant Examiner—W. R. Wolfe
Attorney, Agent, or Firm—Cushman, Darby & Cushman

[57] ABSTRACT

A method and apparatus for controlling the fuel injection timing of a compression ignition engine are featured by dithering the fuel injection timing so as to be advanced and retarded with respect to and in the vicinity of a calculated timing of injection of pressurized fuel supplied to the engine which calculated injection timing is determined in accordance with operating conditions of the engine, operating the engine alternately at the calculated fuel injection timing, the advanced fuel injection timing and the retarded fuel injection timing each during a given period of time, deciding a direction of improving a fuel consumption rate of the engine from corresponding changes of an operating condition of the engine detected when the engine is operated at the respective fuel injection timings, and correcting the calculated fuel injection timing in accordance with the result of the decision, thereby controlling the fuel injection timing at an optimum fuel injection timing which ensures an optimum fuel consumption rate.

6 Claims, 6 Drawing Figures

METHOD AND APPARATUS FOR CONTROLLING FUEL INJECTION TIMING FOR COMPRESSION IGNITION ENGINES

BACKGROUND OF THE INVENTION

1. Field of the Invention

The present inventionn relates to a fuel injection timing control method and apparatus for feedback-controlling the fuel injection timing of a compression ignition engine so as to minmize the fuel consumption rate thereof.

2. Description of the Prior Art

In a conventional compression ignition engine, the timing of fuel injection is controlled by a device called a timer which is actuated by a centrifugal force, hydraulic pressure or the like so as to change, for example, the rotational angle of the engine crankshaft which determines the timing of the operation of a member associated with the fuel ignition.

In a compression ignition engine, its fuel consumption rate varies greatly depending on the fuel injection timing and thus it is a conventional practice to set the injection timing placing emphasis on the fuel consumption rate. However, in the conventional control apparatus as mentioned above, it is impossible to accurately determine the direction in which the injection timing should be advanced or retarded to improve the fuel consumption rate, so that it is impossible to adjust the injection timing properly to ensure the minimum fuel consumption rate under all operating conditions of the engine, thus causing the deterioration of the fuel consumption rate. Moreover, the change over time of the engine and the fuel injection timing control appartus, the dispersion of the characteristic among engines, etc., give rise to the deterioration of the fuel consumption rate as well as the air-polluting emission of exhaust gases, exhaust smoke and the like. The deficiencies can not be eliminated in the prior art apparatus unless it is subjected to complicated adjustments.

The present invention has been made with a view to solving these problems.

SUMMARY OF THE INVENTION

It is an object of this invention to provide a method and apparatus for controlling the timing of fuel injection at the optimum injection timing which ensures a best fuel consumption rate, namely, a maximum engine power output under various operating conditions of an engine or in spite of changes over time in the characteristics of the engine and the fuel injection timing control apparatus.

To accomplish this object, the present invention is featured in selecting at least two fuel injection timings which are different from each other and each of which is close to but differs by a predetermined fuel injection timing angle from a calculated fuel injection timing determined in accordance with the operating conditoins of a compression ignition engine, operating the engine alternately during a predetermined period of time at each of the at least two selected fuel injection timings, comparing the magnitudes of fuel consumption rates of the engine with one another when the engine is operated at the fuel injection timings and deciding from the result of the comparison whether the calculated fuel injection timing is advanced or retarded from the optimum fuel injection timing which ensures a maximum engine power output, and correcting the calculated fuel injection timing in accordance with the result of the decision. The comparison of the magnitudes of the fuel consumption rates with one another may be effected by comparing, with one another, at least three engine rotational speed signals obtained by the continuous operation of the engine at the at least two selected fuel injection timings.

DESCRIPTION OF THE PREFERRED EMBODIMENTS

The present invention will now be described in greater detail with reference to the illustrated embodiments.

Figure 1:
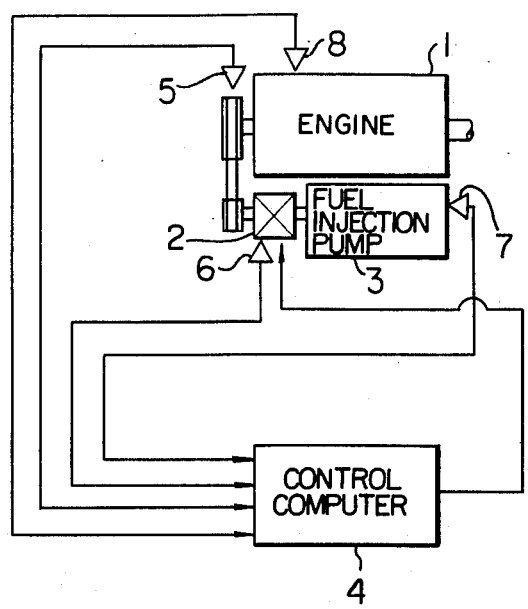
FIG. 1 is a general structural drawing showing an embodiment of this invention.

FIG. 1 shows a general construction of an apparatus to which the method of this invention is applied. Numeral 1 designates a compression ignition engine which drives, by way of a timing belt, gears, etc., an electric timer 2 for controlling the timing of fuel injection and a fuel injection pump 3 for controlling the quantity of fuel to be injected. The electric timer 2 is so constructed that the timing of fuel injection is adjusted by varying the rotational phase of the drive shaft of the fuel injection pump 3 with respect to the driving shaft of the engine 1 by means of hydraulic pressure which is controlled by an electric signal. In the case of a distributor type fuel injection pump, the timer 2 is integrally incorporated in the pump. Numeral 4 designates a control computer which receives detection signals from an engine speed detector 5, a fuel injection timing detector 6, a fuel injection quantity detector 7 and a cooling water temperature detector 8 for detecting the engine cooling water temperature, performs computational operations, which will be described later, determines a desired injection timing and adjusts the hydraulic pressure in the electric timer 2, thereby controlling the fuel injection timing.

Figure 2:
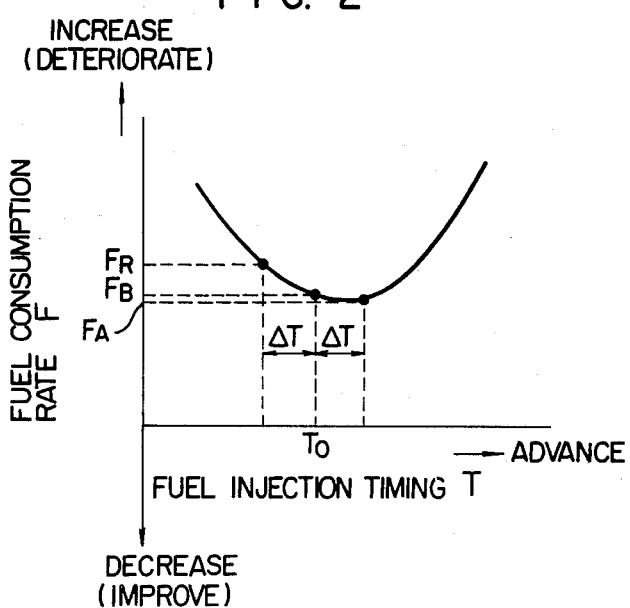
FIG. 2 is a characteristic diagram showing the relationship between the fuel injection timing and the fuel consumption rate.

FIG. 2 is a characteristic diagram showing the relationship between the fuel injection timing T and the fuel consumption rate F with the rotational speed and the output shaft torque of an engine maintained constant. It is apparent from this Figure that there is an optimum injection timing which gives the best (minimum) fuel consumption rate. In the present embodiment, a principal injection timing is obtained by a map search using the engine rotational speed and the fuel injection quantity as parameters, and then the cooling water temperature correction for the principal injection timing thus obtained is effected to give a calculated injection timing. Then, the engine is operated at three fuel injection timings, i.e., the calculated injected timing and two other injection timings, which are respectively advanced and retarded from the calculated injection timing, and the direction of improving the fuel consumption rate is decided from the state of the change of the rotational speed of the engine.

Figure 3:
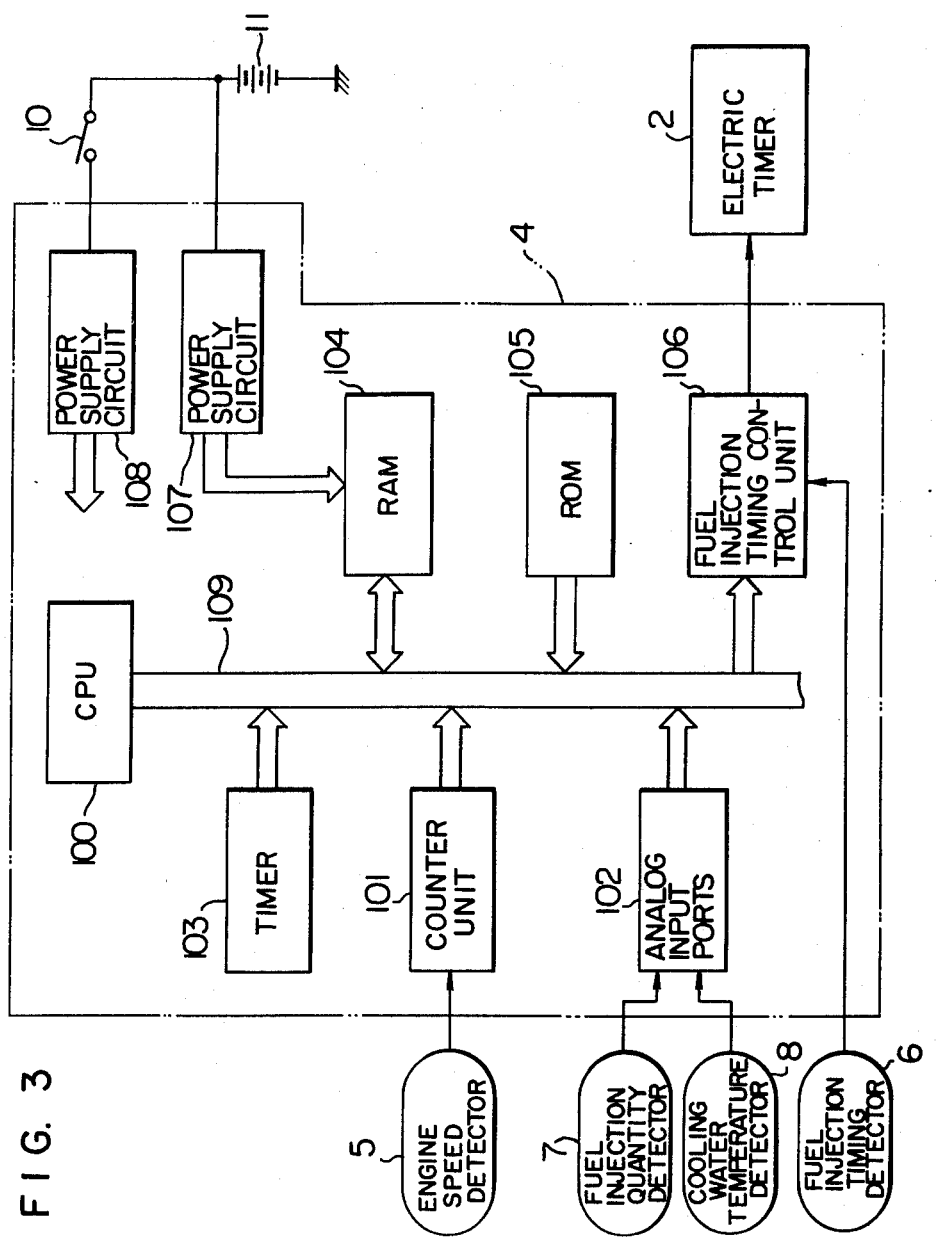
FIG. 3 is a detailed structural drawing showing the control computer shown in FIG. 1.

The control computer 4 will be described in greater detail with reference to FIG. 3. Numeral 100 designates a microprocessor (CPU) for computing the timing of fuel injection, and 101 a counter unit responsive to a signal from the engine rotational speed detector 5 to detect the rotational speed and crank angle of the engine. Numeral 102 designates analog input ports which function to effect analog-to-digital (A/D) conversion of the signals from the fuel injection quantity detector 7 and the cooling water temperature detector 8 and to make the microprocessor 100 successively read the converted signals. The output data from these units 101 and 102 are transferred to the microprocessor 100 via a common bus 109.

Numeral 107 designates a power supply circuit for supplying electric power to a temporary memory unit or RAM 104 which will be described later. Numeral 11 designates a battery, and 10 a key witch. The power supply circuit 107 is connected to the battery 11 directly but not via the key switch 10. Numeral 108 designates another power supply circuit for supplying electric power to the respective elements in the control computer 4 other than the RAM 104. The RAM 104, which provides temporary storage during the processing of the CPU 100, is a nonvolatile memory, since it is constructed so that electric power is always supplied thereto independently of the operation of the key switch 10 as described above and the information stored therein is not lost even when the key switch 10 is turned off to stop the engine. Numeral 105 designates a read-only memory or ROM for storing programs and various constants. Numeral 106 designates a fuel injection timing control unit responsive to a signal indicative of the injection timing computed by the CPU 100 and a fuel injection timing signal from the fuel injection timing detector 6 to generate an output signal for actually controlling the electric timer 2. Numeral 103 designates a timer for measuring the elapsed time and transmitting the measured time data to the CPU 100.

Figure 4:
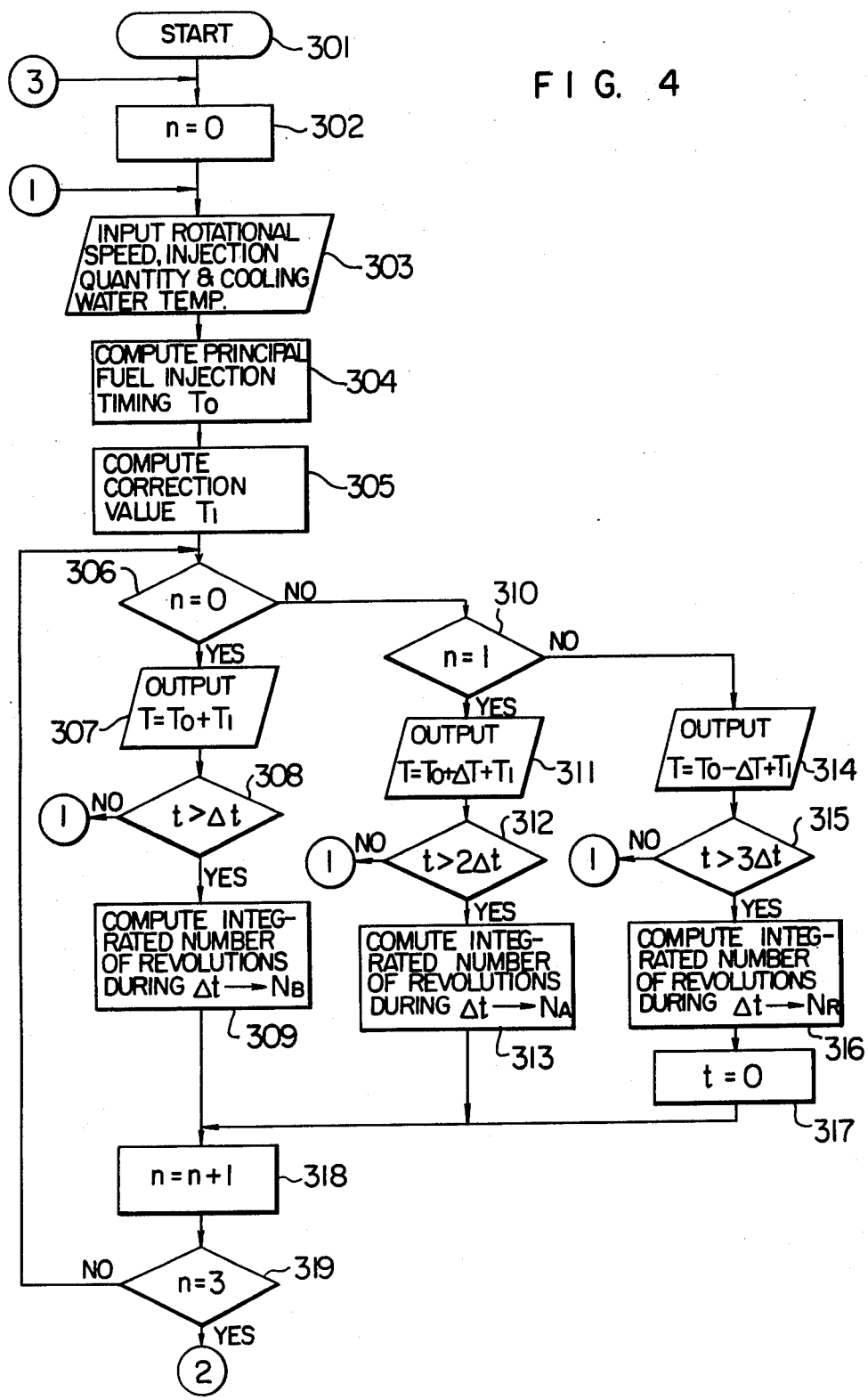
FIGS. 4 and 5 are flow charts showing the processing steps of the control computer shown in FIG. 1.
Figure 5:
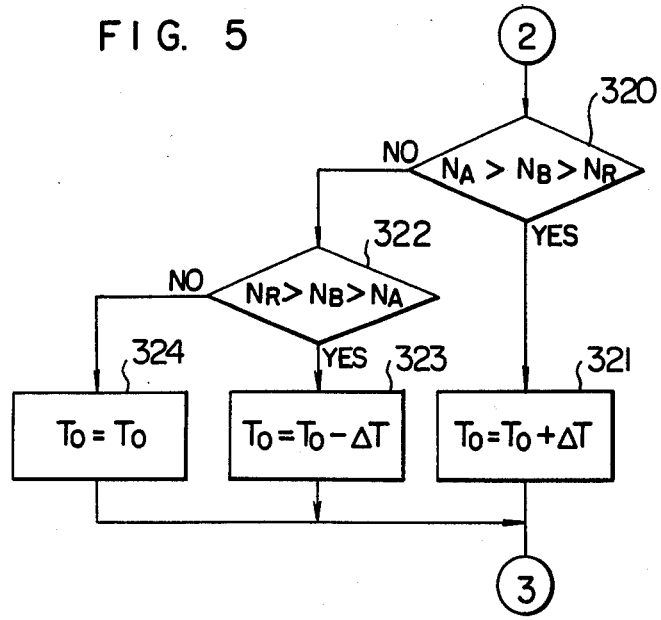

FIGS. 4 and 5 are simplified flow charts showing the processing steps of the CPU 100. The functions of the CPU 100 as well as the operation of the entire system will be described with reference to the flow charts shown in FIGS. 4 and 5.

The processing by the CPU 100 is started at a step 301. When the processing has passed a step 302 and proceeded to a step 303, the signals indicative of the engine rotational speed, the fuel injection quantity and the cooling water temperature representing the operating condition of the engine are taken into the CPU 100. A step 304 computes, in accordance with the engine rotational speed and the fuel injection quantity, a principal fuel injection timing (angle) $T_0$ from the mapped values preliminarily stored in the RAM 104. The next step 305 computes a fuel injection timing correction value $T_1$ corresponding to the cooling water temperature. When the processing has passed a step 306 and advanced to a step 307, the step 307 computes a final injection timing T from $T=T_0+T_1$ and sends the computational result to the fuel injection timing control unit 106 thereby to control the timer 2. A step 308 determines a time period t by the time date supplied from the timer 103 during which time period the engine is operated at the fuel injection timing $T=T_0+T_1$, and then the processing of the steps 303 through 307 is repeated until a predetermined time period $\Delta t$ elapses. When the time period $\Delta t$ has elapsed, a step 309 computes an integrated number of revolutions of the engine during the time period $\Delta t$. The computational result is termed $N_B$. Thereafter, the processing passes steps 318, 319, 306 and 310 to a step 311 where a small incremental fuel injection timing angle $\Delta T$ is added to the current fuel injection timing, that is, the injection timing advanced by $\Delta T$ is obtained and output. The engine is then operated at this fuel injection timing $T=T+\Delta T+T_1$ during the time period $\Delta t$. After the expiration of the further time period $\Delta t$, the processing passes a step 312 to a step 313 where an integrated number of revolutions $N_A$ of the engine during the time period $\Delta t$ is obtained in the manner as mentioned above. Then, the processing proceeds via the steps 318, 319, 306 and 310 to a step 314. The step 314 computes and outputs a fuel injection timing $T=T_0-\Delta T+T_1$ which is retarded from the fuel ignition timing $T=T_0+T_1$ obtained at the step 307 by the small timing angle $\Delta T$. The engine is then operated at this fuel injection timing during the time period $\Delta t$ and then the processing proceeds via a step 315 to a step 316 which computes an integrated number of revolutions $N_R$ of the engine during the time period $\Delta t$. Next, a step 317 resets the time count value to zero (t=0) and the processing proceeds to a step 320 in FIG. 5.

The steps 320 and following determine a direction in which the fuel injection timing is to be advanced or retarded to improve the fuel consumption rate of the engine, and the map of the principal fuel injection timings $T_0$ is corrected in accordance with the result of the determination. In other words, the steps 320 and 322 decides the mutual relation among the respective magnitudes of the integrated numbers of revolutions $N_B$, $N_A$ and $N_R$ of the engine. If the relation $N_A>N_B>N_R$ holds, that is, if the rotational speed increases as the fuel injection timing is advanced, it is decided that the direction of improving the fuel consumption rate resides in the direction of advancing the fuel injection timing, and then a step 321 corrects the principal fuel injection timing angle $T_0$ in the map to be advanced by the small timing angle $\Delta T$. On the contrary, if the relation $N_R>N_B>N_A$ holds, it is decided that the direction of improving the fuel consumption rate resides in the direction of retarding the fuel injection timing, so that a step 323 corrects the principal fuel injection timing angle $T_0$ in the map to be retarded by the small timing angle $\Delta T$. If the relation $N_A>N_B>N_R$ nor $N_R>N_B>N_A$ does not hold, the processing proceeds to a step 324 where the principal fuel injection timing angle $T_0$ is not corrected. That is, when the engine is in the state of being accelerated, for example, even though the engine is firstly operated at the fuel injection timing $T=T_0+T_1$, secondly, at a fuel injection timing which is advanced by $\Delta T$ from the fuel injection timing $T=T_O+T_1$, and lastly at a fuel injection timing which is retarded by $\Delta T$ from the fuel injection timing $T=T_0+T_1$, the engine rotational speed increases steadily irrespective of whether the direction of improving the fuel consumption rate resides in the direction of advancing or retarding the fuel injection timing, and hence the relation $N_B<N_A<N_R$ or $N_B<N_R<N_A$ results. As a result, the relations of the steps 320 and 322 do not hold and the principal fuel injection timing angle $T_0$ is not corrected. On the other hand, when the engine is in the state of being decelerated, the relation $N_B>N_A>N_R$ or $N_B>N_R>N_A$ results, and likewise the relations of the steps 320 and 322 do not hold. Further, if the fuel injection timing $T=T_0+T_1$ is very close to the optimum fuel injection timing, the relations $N_B > N_A$ and $N_B > N_R$ result, so that the relations of the steps 320 and 322 do not hold in the same way, and thus the principal fuel injection timing angle $T_0$ is not corrected.

Figure 6:
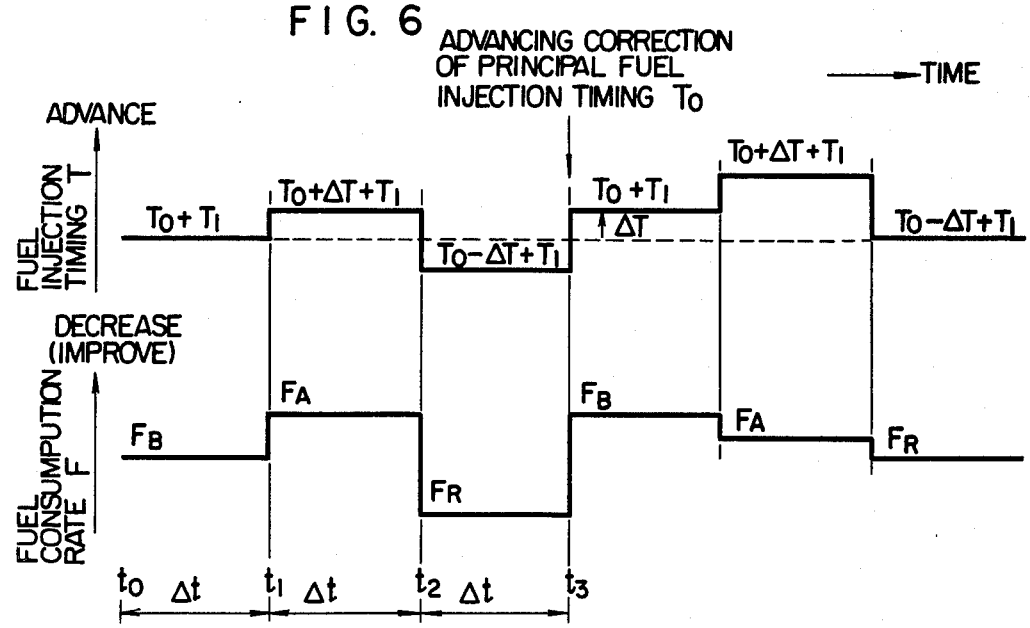
FIG. 6 is a timing chart useful in explaining the operation of the method and apparatus of this invention.

FIG. 6 is a time chart showing the state of changes of the fuel injection timing T and the fuel consumption rate F. As shown in the Figure, the fuel injection timing is dithered to an advanced position at a time $t_1$ and to a retarded position at a time $t_2$. At a time $t_3$, the integrated numbers of revolutions of the engine indicative of the fuel consumption rates for the engine operation at the respective fuel injection timings are compared with one another, whereby a direction for improving the fuel consumption rate is decided thereby to correct the principal fuel injection timing angle $T_0$ by the small timing angle $\Delta T$ (to the advance side in this case).

Since, in the above-described embodiment, the revolution number signals obtained by the continuous engine operation at the three points are compared with one another, it is possible to decide whether the changes of the engine rotational speed are caused by an external factor such as acceleration or deceleration of the engine or by the dithering of the fuel injection timing.

While, in the above-described embodiment, the direction of improving the fuel consumption rate is decided from the state of changes of the engine rotational speed, it is possible to decide such a direction by the use of signals indicative of the engine torque or signals indicative of the operating conditions related to the engine rotational speed or the engine torque.

Further, the time period $\Delta t$ for dithering the fuel injection timing or the principal fuel injection timing correction angle $\Delta T$ may be changed in accordance with the engine operating conditions. This is applicable to such a case where it is required to limit engine speed changes caused by the dithering of the fuel injection timing within a predetermined percentage of the rotational speed of the engine in operation.

Further, instead of dithering the fuel injection timing stepwise, the fuel injection timing may be dithered to vary with gradual increments.

Further, the present invention may be operatively associated with an automatic constant speed drive system such as an auto-drive device, since a remarkable fuel consumption reducing effect is obtainable when such an automatic constant speed drive system is in operation.

From the foregoing it will be seen that in accordance with this invention there is brought a great advantage that, under various operating conditions of a compression ignition engine, the fuel injection timing thereof can be adjusted to the optimum fuel injection timing which ensures a maximum engine power output, thereby improving the fuel consumption rate. Another remarkable advantage is that no special fuel injection timing adjusting operation is required to provide for manufacturing tolerances of engines and changes over time occuring in used engines, whereby the maintenance of engines can be greatly simplified.

We claim:

1. A method for controlling the fuel injection timing of a compression ignition engine comprising the steps of:

selecting three fuel injection timings comprising a calculated fuel injection timing determined in accordance with operating conditions of said engine and an advanced fuel injection timing and a retarded fuel injection timing which are respectively advanced and retarded from the calculated fuel injection timing by a predetermined dithering amount of fuel injection timing;

operating said engine alternately at the three selected fuel injection timings each thereof during a predetermined dithering period;

comparing with one another values of an engine operating parameter related to engine rotational speeds detected when said engine is operated at the three selected fuel injection timings and deciding from the results of the comparison whether the calculated fuel injection timing is advanced or retarded from an optimum fuel injection timing, and, when the decision from the results of the comparison is impossible, deciding whether said engine is accelerating or decelerating; and correcting the calculated fuel injection timing in accordance with said decision from the results of the comparison, but inhibiting the correction when it is decided that said engine is accelerating or decelerating.

2. An apparatus for controlling fuel injection timing of a compression ignition engine having a fuel injection pump, said apparatus comprising:

means for adjusting the fuel injection timing of said fuel injection pump;

a fuel injection timing detector for detecting the fuel injection timing of said fuel injection pump;

a rotational speed detector for detecting rotational speeds of said engine;

a fuel injection quantity detector attached to said fuel injection pump for detection fuel injection quantities;

a cooling water temperature detector for detecting cooling water temperatures of said engine; and computing means having a plurality of input terminals connected to respective output terminals of said fuel injection timing detector, said rotational speed detector, said fuel injection quantity detector and said cooling water temperature detector and an output terminal connected to said electric control signal input terminal to said fuel injection timing adjusting means, whereby said computing means computes a calculated fuel injection timing for supplying fuel to said engine in accordance with input signals thereto and an advanced fuel injection timing and a retarded fuel injection timing for dithering the fuel injection timing so as to be respectively advanced and retarded by a predetermined dithering amount with respect to the calculated fuel injection timing, generates electric control signals in accordance with the results of said computation of the three fuel injection timings and supplies the electric control signals to said fuel injection timing adjusting means to control the same, decides a direction of improving a fuel consumption rate of said engine from values of an operating parameter related to engine rotational speeds detected when said engine is operated alternately at the calculated fuel injection timing, the advanced fuel injection timing and the retarded fuel injection timing each thereof during a predetermined dithering period, and, when the decision of the direction of improving the fuel consumption rate of said engine is impossible, decides whether said engine is accelerating or decelerating, and corrects the calculated fuel injection timing in accordance with the result of the decision thereby to control the fuel injection timing at an optimum fuel injection timing which provides a best fuel consumption rate, but inhibits the correction when it is decided that said engine is accelerating or decelerating.

3. A control apparatus according to claim 2, wherein said computing means comprises memory means and wherein the calculated fuel injection timing is a sum of a principal fuel injection timing and a cooling water temperature correction value, and values of the principal fuel injection timing are stored in said memory means in the form of a two-dimensional map in accordance with values of the engine rotational speed and values of the fuel injection quantities.

4. A control apparatus according to claim 2 or 3, wherein the detected operating parameter of said engine is the rotational speed of said engine.

5. A control apparatus according to claim 2 or 3, wherein the detected operating parameter of said engine is an output torque of said engine.

6. A control apparatus according to claim 2 or 3, wherein at least one of the dithering amount and the dithering period for dithering the fuel injection timing is changed in accordance with the operating parameter of said engine.

* * * * *